(No Model.)  G. C. DAVISON.  7 Sheets—Sheet 1.
BRICK MACHINE.

No. 598,243.  Patented Feb. 1, 1898.

(No Model.) 7 Sheets—Sheet 2.

G. C. DAVISON.
BRICK MACHINE.

No. 598,243. Patented Feb. 1, 1898.

Witnesses
John Enders Jr.
Royal E. Burnham.

Inventor
George C. Davison,
by Edward ......., Attorney (No Model.)
G. C. DAVISON.
BRICK MACHINE.
No. 598,243. Patented Feb. 1, 1898.
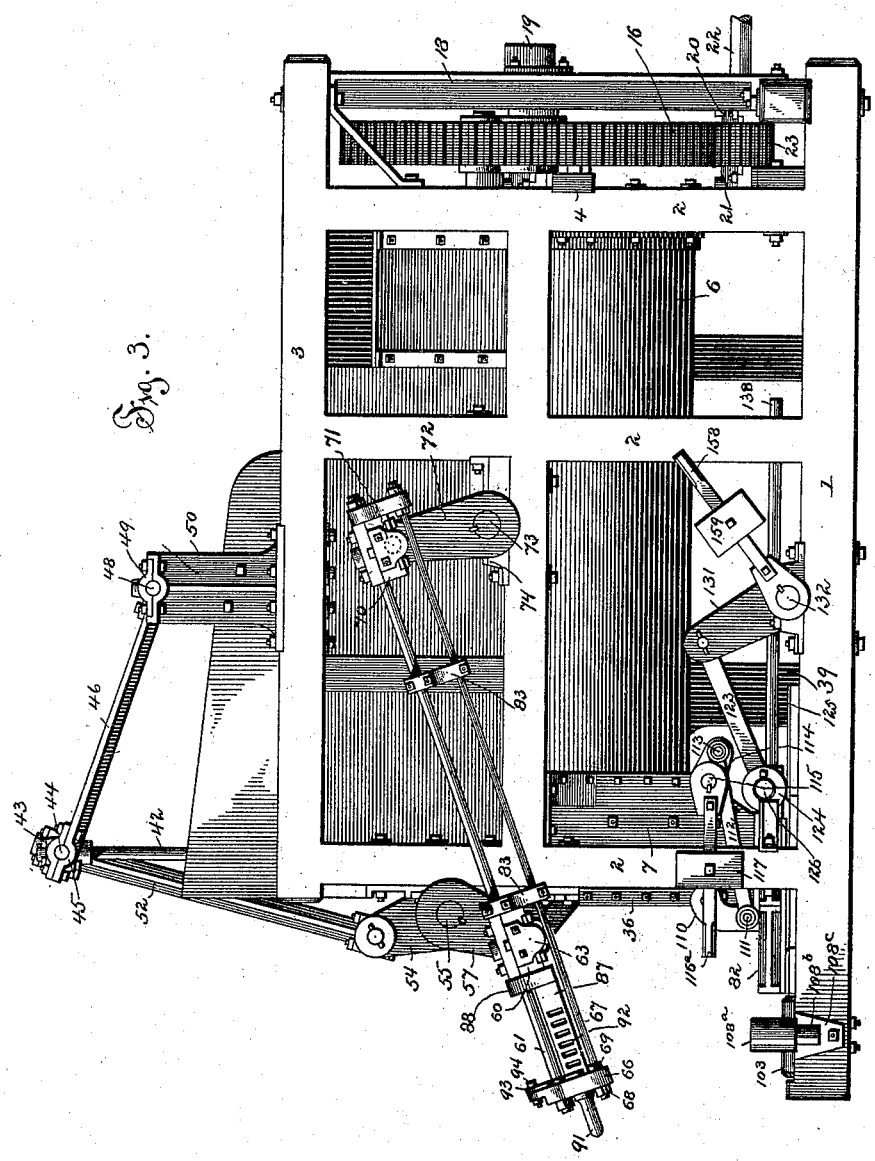
Witnesses
John Enders Jr.
Royal E. Burnham.
Inventor
George C. Davison,
by Edward Treadwell
Attorney (No Model.) 7 Sheets—Sheet 4.
G. C. DAVISON.
BRICK MACHINE.
No. 598,243. Patented Feb. 1, 1898.
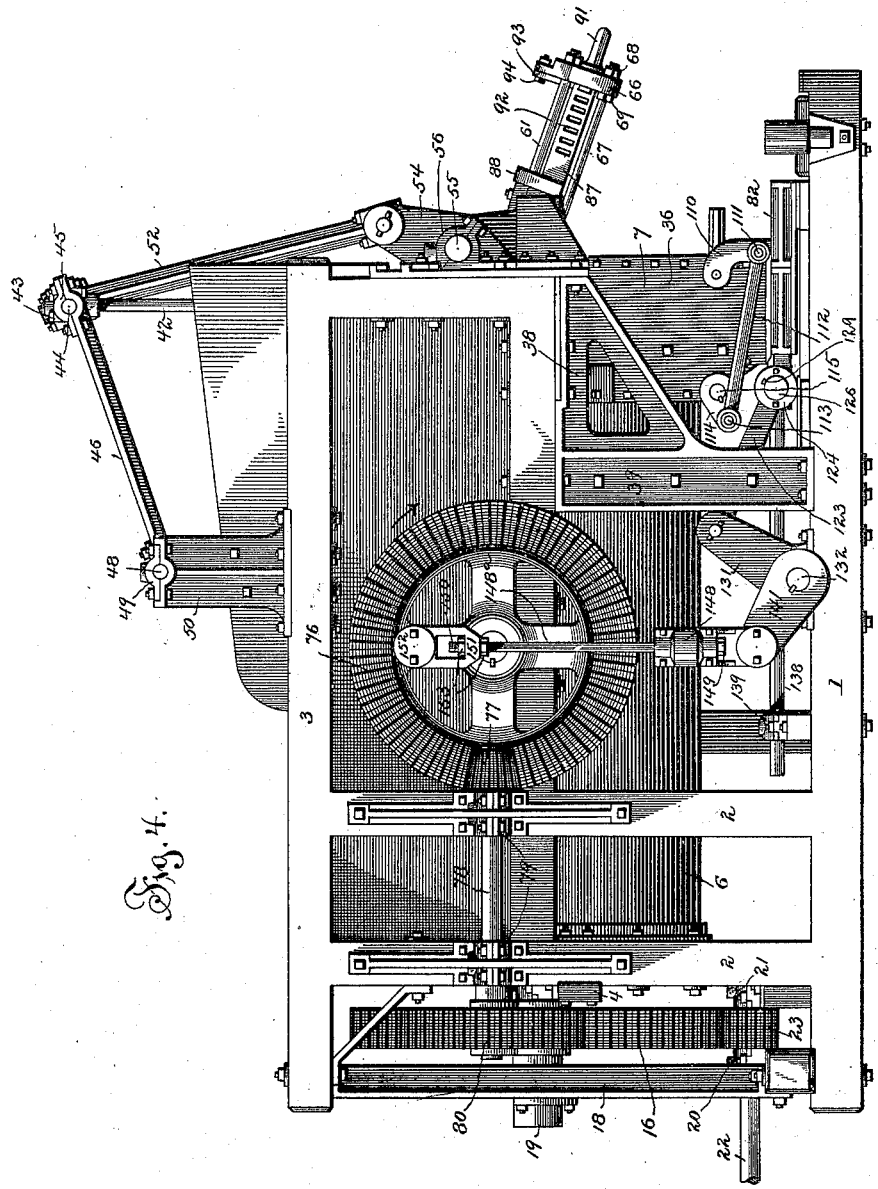
Witnesses
John Enders, jr.
Royal E. Burnham.
Inventor
George C. Davison,
by Edward Hervey, Attorney (No Model.)  G. C. DAVISON.  7 Sheets—Sheet 5.
BRICK MACHINE.

No. 598,243.  Patented Feb. 1, 1898.

Witnesses
John Enders, Jr.
Royal E. Burnham.

Inventor
George C. Davison,
By Edward Heaver, Attorney (No Model.) 7 Sheets—Sheet 7.

G. C. DAVISON.
BRICK MACHINE.

No. 598,243. Patented Feb. 1, 1898.

Witnesses
John Enders Jr.
Royal E. Burnham.

Inventor
George C. Davison,
by Edward␣ Heavy,
Attorney

UNITED STATES PATENT OFFICE.

GEORGE CLOSSON DAVISON, OF TYRONE, PENNSYLVANIA.

BRICK-MACHINE.

SPECIFICATION forming part of Letters Patent No. 598,243, dated February 1, 1898.

Application filed January 21, 1897. Serial No. 620,008. (No model.)

*To all whom it may concern:*

Be it known that I, GEORGE CLOSSON DAVISON, a citizen of the United States, residing at Tyrone, in the county of Blair and State of Pennsylvania, have invented certain new and useful Improvements in Brick-Machines, of which the following is a specification, reference being had therein to the accompanying drawings.

My invention relates to machines for the manufacture of brick, and more particularly to that class of machines known as "soft-mud presses" and wherein the pugging and tempering of the clay is carried on at once with the operation of filling and striking the molds, as well as delivering the latter in a convenient manner for emptying upon the pallet.

In my invention I have combined certain new and useful features of construction that I will first fully describe and illustrate with the aid of the accompanying drawings, in which—

Figure 1:
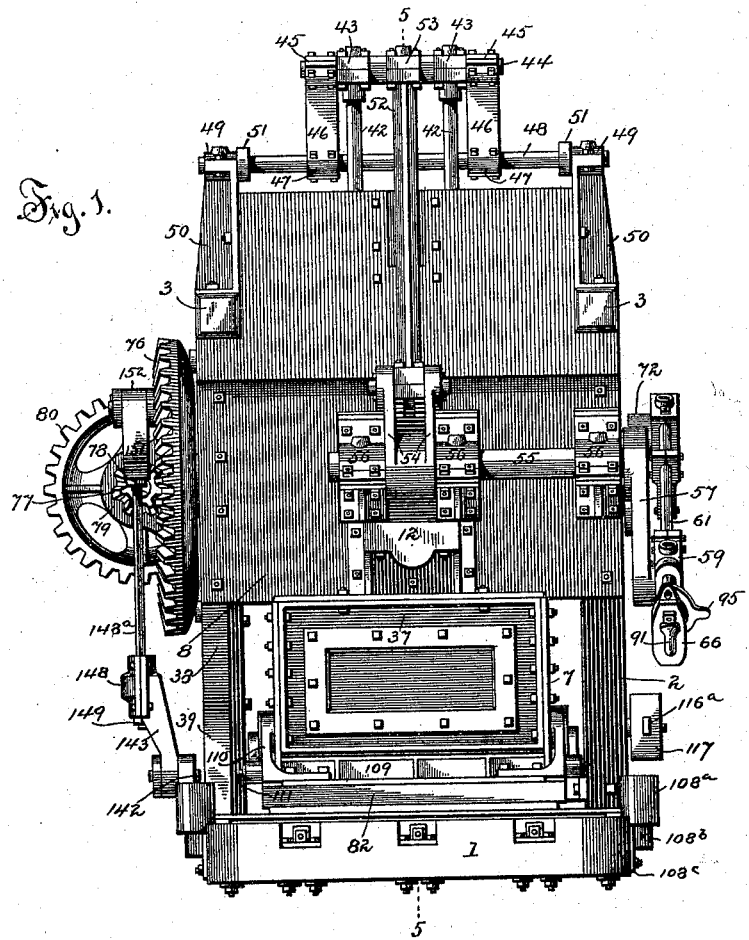
Figure 2:
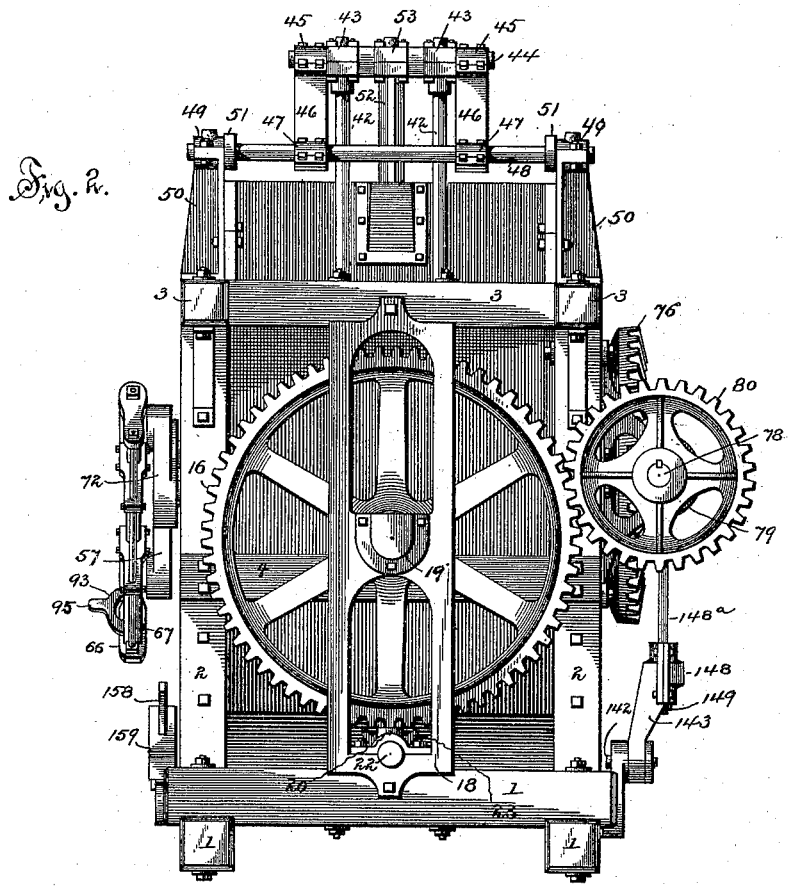
Figure 12:
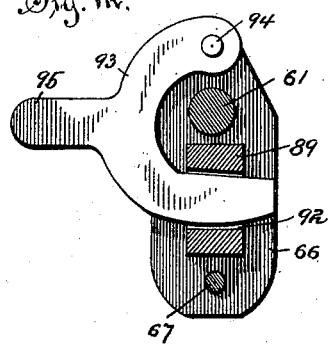
Figure 13:
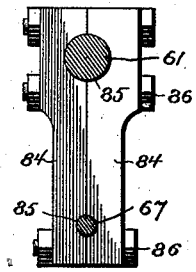
Figure 5:
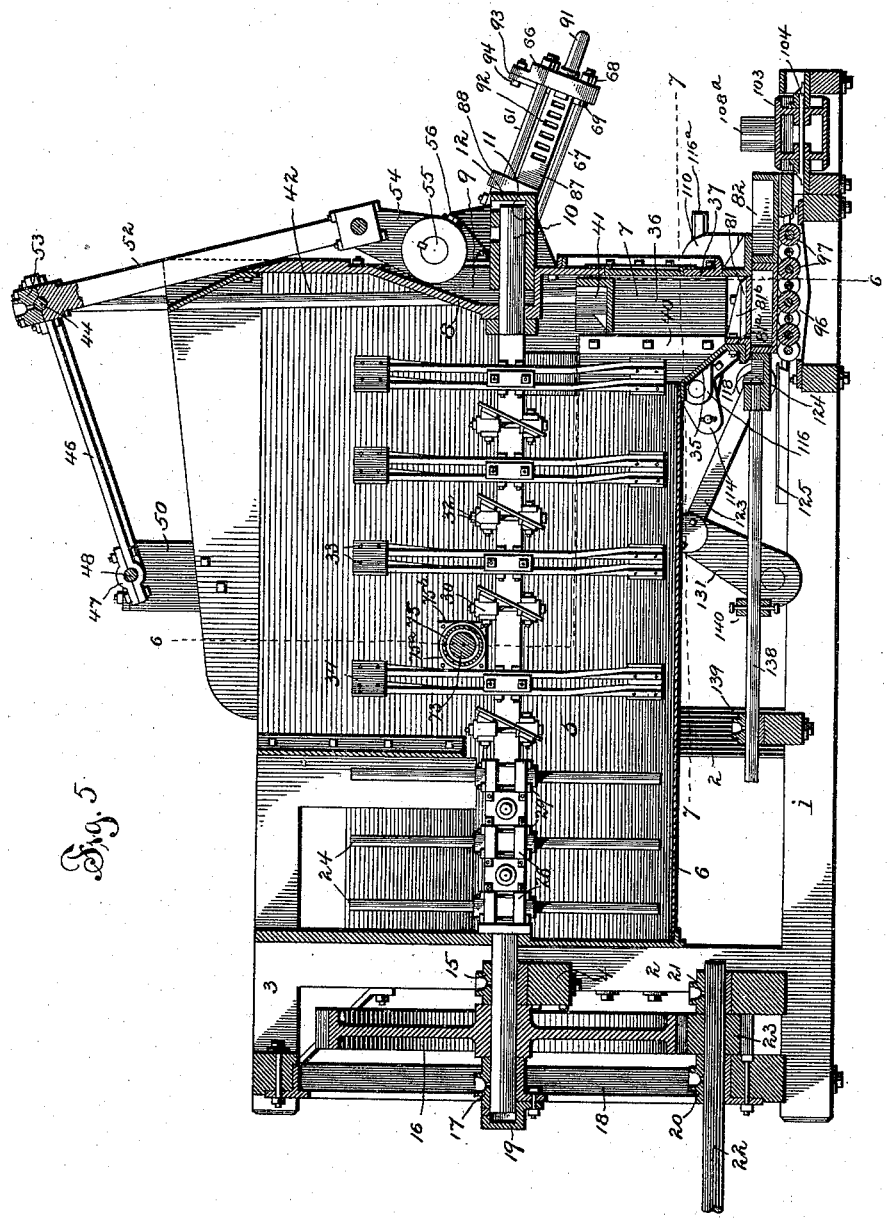
Figure 6:
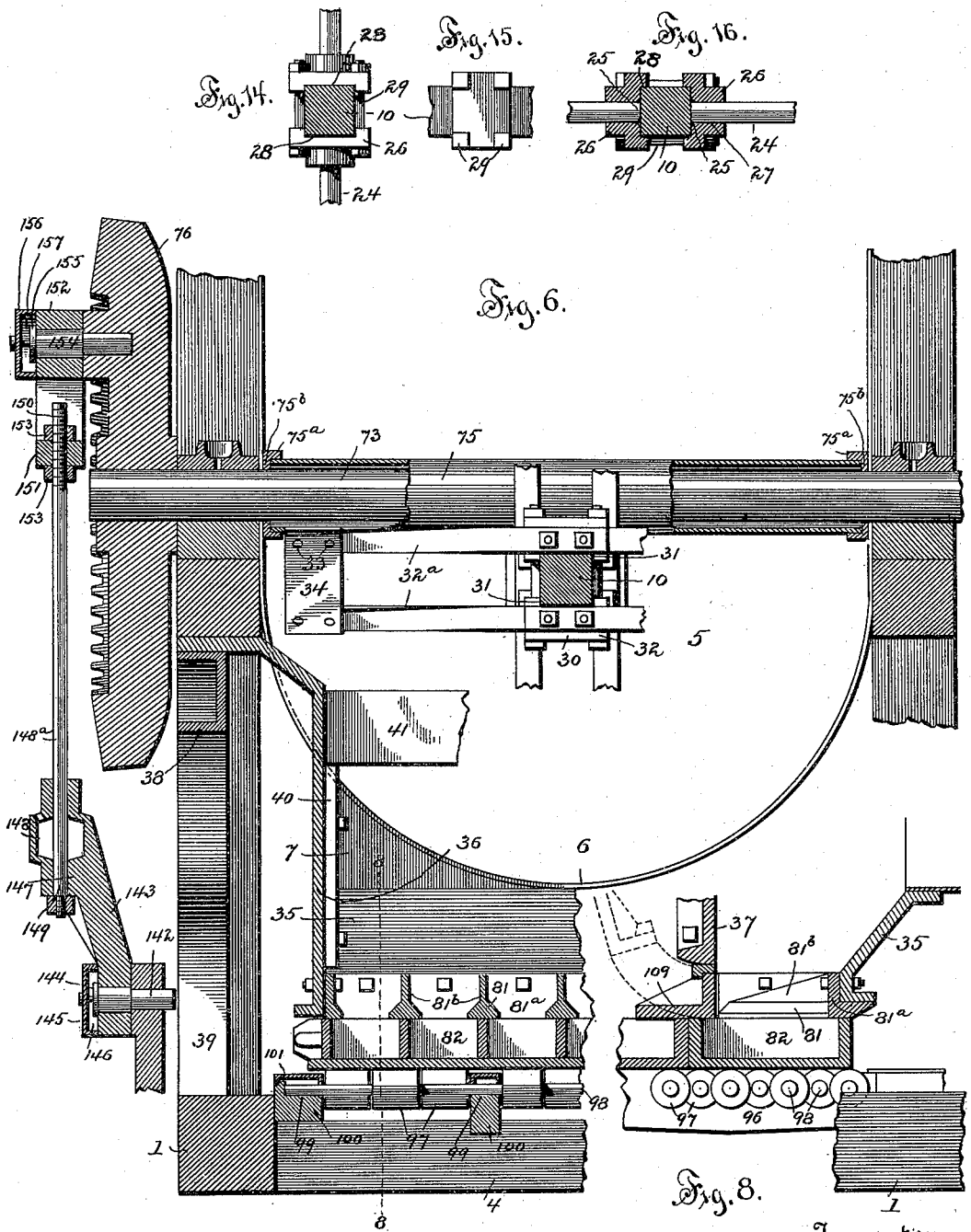
Figure 7:
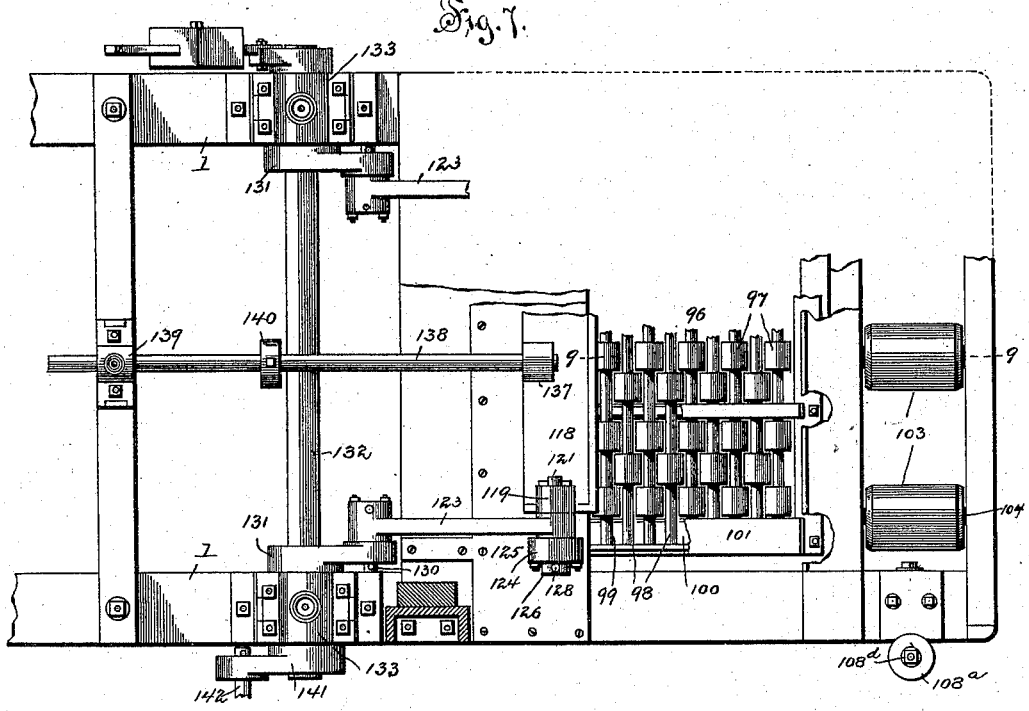
Figure 9:
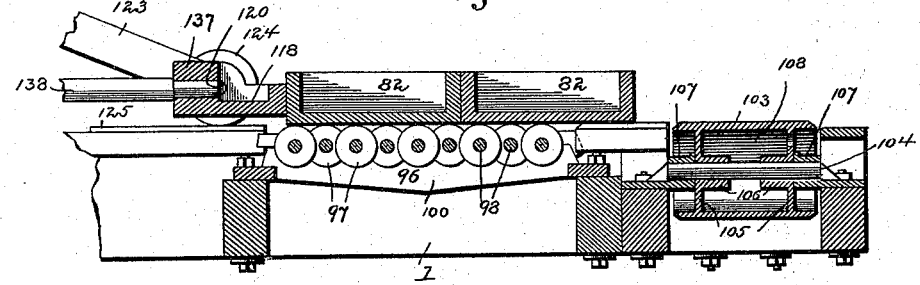
Figure 17:
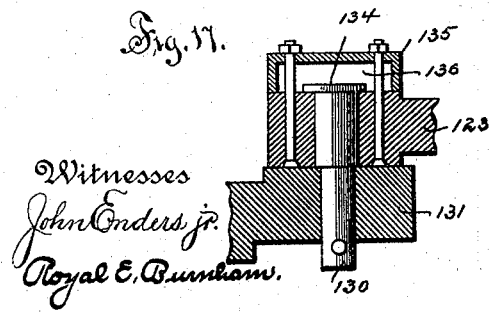
Figure 18:
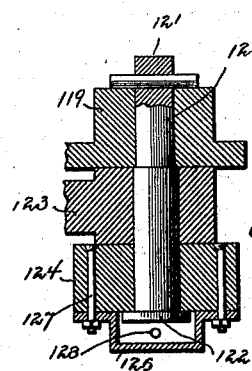

Figure 1 is a front elevation of the machine. Fig. 2 is a rear elevation thereof. Figs. 3 and 4 are side elevations. Fig. 5 is a vertical longitudinal section upon the line 5 5 of Fig. 1. Fig. 6 is a partial vertical transverse section upon the line 6 6 of Fig. 5. Fig. 7 is a partial plan view on the longitudinal section 7 7 of Fig. 5. Fig. 8 is a vertical section of Fig. 6 on the line 8 8. Fig. 9 is vertical section of Fig. 7 on line 9 9. Figs. 10, 11, 12, 13, 14, 15, 16, 17, and 18 are details.

In all of the figures the same numeral indicates the same part.

1 represents the sills of the machine-frame, having the uprights 2, supporting the plates 3, and having the transverse timbers 4, within which structure the main parts of the machine are assembled. Secured within the said frame structure in a manner well known to the art is the pugging chamber or tub 5, with a round bottom 6 and preferably made of sheet-iron. At the end of the pugging-chamber 5 is located the rectangular pressing-box 7, the structure of which will be hereinafter described.

In further describing the details of my invention I will separate the operation of the machine into three parts—viz., the pugging operation, the pressing operation, and the striking operation—and also separate the description to conform to these successive mechanisms.

*Pugging.*—The preparation of the clay by pugging and tempering preparatory to being molded into the brick takes place in the chamber 5 and is accomplised by the mechanisms now about to be described.

In the front of the machine a reëntrant detent is formed by the plate 8, bolted into place and having the opening 9, in which is journaled the main shaft 10. Secured at the bottom of the plate 8 and on the outside thereof is the shelf-plate 11, forming a boxing for the end of the said shaft 10 and having the step 12 to receive the thrust thereof. The shaft 10 passes through the chamber 5 and is journaled in the other end thereof at boxing 15, resting on the frame 4. A large gear-wheel 16 is keyed to the said shaft 10, and the end thereof rests in the boxing 17 of the metal frame 18, bolted to the frames 1 and 4, and is protected by the end cap 19, bolted to said frame 18 and adapted to receive the thrust of the shaft. Journaled in the boxing 20 at the bottom of the frame 18 and the boxing 21 on the frame 1 is the power-shaft 22, bearing the pinion 23, meshing the gear-wheel 16 and transmitting motion thereto from some convenient source. All the bearings are provided with oil-cups.

Upon a portion of the main shaft 10, which within the pugging-chamber presents a square section, are disposed the whip-rods 24, with flared heads 25 resting upon the opposite faces of the said shaft and maintained in position by the blocks 26, in the holes 27 of which the said rods fit. The blocks 26 have slots 28 fitting over the shaft 10, and they are secured into position in oppositely-disposed pairs by means of the bolts 29. The rods 24 as they are rotated pound and whip the clay admixed with water into a plastic mass of the proper consistency to be taken up by the tempering devices secured to the main shaft 10.

In the tempering devices blocks 30 are so slotted at 31 as to fit over the shaft 10 and are bolted thereon in oppositely-disposed pairs. At the side of the said blocks project the shoulders 32, between which and the shaft 10 are adapted to fit the oppositely-projecting arms $32^a$, duly secured in place by bolting. The adjacent arms $32^a$ are secured at their ends by bolts 33 to the plates 34, this having the effect of twisting or skewing the said arms slightly. When all the arms $32^a$ are in place, they will be found to radiate in pairs from the four sides of the shaft 10, forming a sort of wheel that is essentially a skeleton screw or spiral. Several radial arms being disposed upon the shaft 10 operate not only to temper the clay, but to advance it into the box or chamber 7, wherein the next step, that of pressing, takes place.

*Pressing.*—The chamber 7 comprises a sloping back plate 35, the end plates 36, and the front plate 37, all securely bolted to the pugging-chamber 5. The end plates 36 project at their upper ends and rest upon the bracket 38, integral with the support 39, resting on the frame or sill 1. On the interior face of the end plates 36 are bolted the vertical guide-strips 40 for the plunger-head 41, mounted upon the parallel plunger-rods 42, passing through the tops of the machine and having at their ends the boxings 43, in which is rotatably mounted the shaft 44, the ends of which rest in the boxings 45 of the oscillating stay-arms 46, the other ends of which are provided with boxings 47, in which is rotatably mounted the shaft 48, journaled in the boxings 49 of the pedestals 50, mounted upon the plates 3 of the frame. There is sufficient play between the plunger-head 41 and its guides to provide for the lateral movement of the upper ends of the rods 42, thus obviating any pivotal joints in the said rods. The shaft 48 is provided with the collars 51, adapted to prevent the said shaft slipping in its bearings. An arm 52 is provided at its end with a boxing 53, in which is journaled the shaft 44, the said boxing being located between the boxings of the plunger-rods 42. The other end of the arm 52 is journaled to the crank-arms 54 of the rocking shaft 55, journaled in the brackets 56, so disposed that the body of the said crank-arms reposes in the reëntrant detent of plate 8. At the outer end of the shaft 55 is keyed the crank 57, having the wrist-pin 58, journaled in the boxing 59, comprising the suspension-plate 60, slidably mounted upon the connecting-rod 61, the supporting-plate 62, bolted thereto, and the end hood 63, forming an inclosed oiling-chamber 64. The rod 61 has at its ends the shoulders 65, on which are secured the plates 66, in the other ends of which is secured the stay-rod 67 by the threaded set-nuts 68, and the locknuts 69 permitting tightening. Also slidably mounted upon the rod 61 is a boxing 70 of similar construction to the boxing 59, in which is journaled the wrist 71 of the crank 72, secured to the shaft 73, journaled in the boxings 74, secured to the timbers 4, the said shaft passing through a sleeve 75, traversing the pugging-chamber 5 just above the main shaft 10. The sleeve 75 is stepped in the annular flanges $75^a$ of the plates $75^b$, duly bolted to the inner sides of the said chamber 5. Mounted upon the other end of the shaft 73 is the bevel gear-wheel 76, intermeshed by the bevel-pinion 77, secured to the shaft 78, journaled in the bracket-bearings 79, secured to the frame 2, and having secured to its other end the gear-wheel 80, meshing the gear-wheel 16 and receiving motion therefrom.

It will be readily seen that by the mechanisms thus described for the transmission of power the plunger 41 is reciprocated in a vertical direction and is adapted to press the plugged clay through the ribbed fingers 81 of the removable die $81^a$, secured to the plate 35, and into the molds 82, the action and operation of which will be hereinafter described. The upwardly-projecting beveled rib $81^b$ of the finger 81 shears the descending clay and tends to throw it forward in the mold where most needed. It will be found desirable, in the working of the plunger 41, to vary both its upward and downward travel, which end I attain in the manner following.

Mounted upon the rods 61 and 67 are the stops 83, comprising the sections 84, with openings 85, and adapted to be secured in position by the clamping action of the bolts 86. The operation of these stops 83 is to adjust the rise of the plunger 41 by varying the distance between the operative points of the boxings 59 and 70. Likewise to adjust the fall of the plunger 41 is the adjustable stop 87, comprising the head 88, slidably mounted upon the rod 61 and having the stem 89 passing through the opening 90 in the adjacent plate 66, ending in the handle 91. In the stem 89 are disposed a series of slots 92, in one of which the key 93, pivoted to the plate 66 at 94, is adapted to be thrust by its handle 95. Thus at any time, even while the machine is in operation and when the boxing 59 impinges the stop 83, the key 93 may be released, the stop 87 varied by its handle 91, and the said key reinserted.

When the clay has been pressed into the molds, as described, it is ready for the next process, known as "striking."

*Striking.*—Beneath the molds is located an antifriction-table 96, comprising the interlocking rollers 97, having the gudgeons 98 journaled in the grooves 99 upon the beams 100, secured in the frames or sills 1. The channel-cover 101 is adapted to be inverted over the said gudgeons and forms a dust-cap within which the lubricator may be placed. While being filled with clay by the plunger 41, the mold rests upon the table 96 and when completely filled is pushed forward by a mechanism to be hereinafter described upon an endless apron (not deemed necessary to show) traveling upon the broad pulleys 103, rotating upon the shafts 104, journaled in the sills 1 of the machine. The pulley 103 is a hollow one, the web-flange 105 turning into a reëntrant hub 106, closely abutting the outside sleeve 107. The chamber 108 of the pulley may be filled with a lubricant. Disposed at ends of the apron are the bumping-posts $108^a$, of rubber or similar material, secured to the sockets 108$^b$ of the brackets 108$^c$ by the bolts 108$^d$. While the mold is being pressed forward in the manner to be later described, it passes beneath the striker-gate 109, secured to the ends of which are the arcuate arms 110, pivoted to the chamber 7. Projecting from the said arms 110 are the wrist-pins 111, pivotally secured to the connecting-rods 112, journaled at their other ends to the wrist-pins 113 of the cranks 114, secured to the shaft 115, journaled in the lugs 116, projecting from the plate 35. At one outer end of the shaft 115, and, if desired, to both ends thereof, is secured the arm 116$^a$, carrying the weight 117, adapted to press the pivoted gate 109 to its seat with considerable firmness. This pressure may be readily varied by the adjustment of the said weight. The rods 112 may be curved, if desired, to approach nearer the dead-center in order to increase the resistance of the gate.

I will now describe the mechanism by which the molds are thrust beneath the plunger and are struck from the machine.

A horizontal plunger-plate 118 has at its ends the bosses 119, with the openings 120 for the reception of the wrists 121, having the heads 122, and journaled to each of which is the arm 123 and the rolls 124, racing upon the rail 125, secured to the sills 1. A cap 126 is bolted to the face of the roll 124 and over the head 122 by the bolts 127, forming a cup for the reception of a lubricant through the hole 128, with closure 129, Fig. 4. The other ends of the arms 123 are journaled to the wrist-pins 130 of the cranks 131, secured to the shaft 132, rocking in the bearings 133, secured to the sills 1. The head 134 of the wrist-pin 130 is guarded by a cap 135, bolted to the arm 123 and forming a chamber 136 for the reception of a lubricant.

In the central portion of the plate 118 is a projecting boss 137, to which is secured the guide-rod 138, reciprocating through the keeper 139, bolted to the sill 1. Adjustably secured to the said rod is a stop 140, adapted to determine the rearward traverse of the plate 118 by impinging the keeper 139.

Secured to the extremity of the rocking shaft 132 is the crank 141, journaled in the end of which is the wrist-pin 142 of the arm 143. The head 144 of the pin 142 is protected by the cap 145, bolted to the arm 143 and forming a receptacle 146 for a lubricant. The arm 143 is bent outward at 147 and has at its end the stuffing-box 148, traversing which is the coupling-rod 148$^a$, having head 149 and threaded end 150, secured in the turnbuckle 151 of the boxing 152 by the set-nuts 153. The boxing 152 has journaled within it the wrist-pin 154 of the bevel gear-wheel 76 and is actuated thereby. The head 155 of the pin 154 is protected by the cap 156, secured to the boxing 152 and forming a chamber 157 for the reception of a lubricant. At the other extremity of the rocking shaft 132 is the arm 158, bearing the adjustable weight 159 and adapted to carry the plate 118 rearward after the forward stroke in order that a new mold may be inserted by the operator.

While the machine is operating, there is a continuous rotation of the main shaft 10 and of the pugging, tempering, and forwarding mechanisms and also of the shaft 73. The mechanisms actuated, however, by the latter present a sequence of movement marked by the quarters of the whole revolution of the said shaft. Thus as the said shaft 73 rotates in the direction of the arrow in the first quarter of its revolution the plunger 41 rises and the plate 118 is permitted to be retracted by its counterweight. During the second quarter of the said revolution the plunger is poised and the rod 148$^a$ slides in its stuffing-box, the plate 118 having struck its stop. During the third quarter of the revolution the plunger 41 is forced down, filling the mold. The rod 148$^a$ again slides back in its stuffing-box. In the fourth quarter the plunger remains in its lowest position. The plate 118 is forced forward and the brick is struck.

Having fully described my invention and shown its operation, I will now define the matter for which I desire to secure Letters Patent and claim—

1. In a brick-machine, the combination of a pugging-chamber, bearings at the ends thereof and a main pugging-shaft journaled therein with means for actuating the same, a sleeve traversing the pugging-chamber and the plates with annular flanges adapted to secure the said sleeve in place, a shaft traversing the said sleeve, means for transmitting motion from the main pugging-shaft to the said transverse shaft, a vertical mold-filling plunger and a horizontal mold-pushing plunger, means for transmitting correlative motion from the said transverse shaft to both of said plungers, means for independently adjusting the traverse of both the said plungers, and a striking mechanism, substantially as described.

2. In a brick-machine, a mold-plunger mechanism adapted to thrust the mold under the striker, comprising the plunger-plate, the wrist-pins at the ends thereof, the connecting-rods and the guide-rollers journaled on said wrist-pins, a rocking shaft with crank-arms pivotally secured to the said connecting-arms, a weighted lever secured to the rocking shaft adapted to return the plunger-plate, a crank secured to the rocking shaft, a driving gear-wheel, and the loose pitman transmitting motion from the said gear-wheel to the said crank, substantially as and for the purpose described.

3. In a brick-machine, a mold-pushing-plunger mechanism comprising a plunger-plate, a rocking shaft coupled thereto, a gear-wheel with pitman coupled to said rocking shaft and adapted to throw it forward, a weighted lever adapted to return said shaft, a guide-rod secured to the plunger-plate and a keeper for said rod, combined with an adjustable stop upon said guide-rod to regulate the return, substantially as and for the purpose described.

4. In a brick-machine, a plunger mechanism to thrust the molds through the striker, comprising a plunger-plate, a rocking shaft, means for transmitting motion from the said rocking shaft to the said plunger-plate and means for retracting said plunger-plate, a crank secured to the said rocking shaft, a driving-wheel, and a pitman comprising an arm journaled to said crank, a stuffing-box at the end of said arm, a connecting-rod traversing the said stuffing-box swiveled to the end thereof, and a wrist-pin of the driving-wheel entering the said box, combined with means for actuating the said wheel, substantially as and for the purpose described.

5. In a brick-machine, a pitman for transmitting motion therein, comprising a boxing with a wrist-pin therefor, a cap bolted over the head of said wrist-pin and forming a receptacle for lubricant, a swivel-head in said boxing, a rod secured in said swivel-head by set-nuts, a stuffing-box retaining the said rod, and an arm to said stuffing-box, the said arm having a boxing containing a wrist-pin likewise protected by a cap, substantially as and for the purpose described.

6. In a brick-machine, the combination of a pug-mill, mechanism for striking the molds, and a mechanism for filling them, comprising a plunger-head, vertical guides therefor, plunger-rods secured to the said head and journaled to a shaft, stay-arms likewise journaled to the shaft, a rocking shaft journaled to the ends of the said stay-arms, and pivotally secured to the machine-frame, a rocking shaft journaled at the front of the machine, a crank therefor, a connecting-rod pivotally secured to said crank and to the before-mentioned shaft, and means for transmitting power to the said rocking shaft, substantially as described.

7. In a brick-machine, the combination of a pug-mill, mechanism for striking the molds, and a mechanism for filling them comprising a vertical plunger actuated by a rocking shaft, a bell-crank for said rocking shaft, an adjustable connecting-rod journaled to the wrist of said crank, a shaft traversing the pug-mill, a crank on said shaft connected to the adjustable connecting-rod, a sleeve encircling the said second shaft and means for rotating the said shaft, substantially as described.

8. In a brick-machine, the combination with a pugging-chamber and frame thereof, of a mold-filling mechanism comprising a plunger-head, vertical guides therefor, plunger-rods secured thereto, and journaled to a shaft, stay-rods journaled to the said shaft, the pedestals secured to the frame, the rocking shaft journaled therein and in the ends of the stay-rods, a rocking shaft journaled to the front of the pugging-chamber, a crank secured to the rocking shaft, a connecting-rod journaled to said crank and to the shaft, a crank secured to the other end of the rocking shaft, an adjustable connecting-rod journaled to the said crank, a sleeve traversing the pugging-chamber, a shaft rotating therein, a crank at the end thereof journaled to the said connecting-rod, and means for rotating the shaft, substantially as and for the purpose described.

9. In a brick-machine, an adjustable connecting-rod therefor, comprising two rods, end plates securing the said rods in parallel juxtaposition, slidable journal-boxes mounted upon the said rods, and adjustable stops therefor, substantially as described.

10. In a brick-machine, an adjustable connecting-rod comprising parallel rods, journal-boxes slidably mounted upon one thereof, and adjustable stops therefor clamped to the said rods, substantially as described.

11. In a brick-machine, an adjustable connecting-rod therefor comprising parallel rods, journal-boxes slidably mounted upon one thereof, stops clamped to the said rods, and a gage-stop slidably mounted upon one of said rods and maintained in position by a transverse key, substantially as and for the purpose described.

12. In a brick-machine, an adjustable connecting-rod therefor, comprising parallel rods secured at the ends to connecting-plates, and a gage-stop therefor comprising a head slidably mounted on one of said rods, a stem passing through one of said connecting-plates, slots in said stem, and a key pivoted to the said connecting-plate and engaging one of said slots, substantially as described.

In testimony whereof I affix my signature in presence of two witnesses.

GEORGE CLOSSON DAVISON.

Witnesses:
H. B. CALDERWOOD,
EDWARD C. WEAVER.